United States Patent
Naghshnejad et al.

(10) Patent No.: US 12,001,791 B1
(45) Date of Patent: *Jun. 4, 2024

(54) SYSTEMS AND METHODS FOR SCREENING DATA INSTANCES BASED ON A TARGET TEXT OF A TARGET CORPUS

(71) Applicant: Wells Fargo Bank, N.A., San Francisco, CA (US)

(72) Inventors: Mina Naghshnejad, San Francisco, CA (US); Angelina Yang, San Francisco, CA (US); Tarun Joshi, San Francisco, CA (US); Vijayan Nair, San Francisco, CA (US); Harsh Singhal, San Francisco, CA (US); Agus Sudjianto, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,689

(22) Filed: Oct. 11, 2022

Related U.S. Application Data

(63) Continuation of application No. 16/856,673, filed on Apr. 23, 2020, now Pat. No. 11,501,067.

(51) Int. Cl.
*G06F 40/242* (2020.01)
*G06F 40/295* (2020.01)
*G06Q 20/40* (2012.01)

(52) U.S. Cl.
CPC .......... *G06F 40/242* (2020.01); *G06F 40/295* (2020.01); *G06Q 20/4014* (2013.01)

(58) Field of Classification Search
CPC ............... G06F 16/258; G06F 16/3329; G06F 16/3344; G06F 16/3347; G06F 16/374; G06F 16/783; G06F 40/117; G06F 40/242; G06F 40/247; G06F 40/263; G06F 40/284; G06F 40/295; G06F 40/55; G06F 3/0237; G06F 16/36; G06F 18/214; G06F 40/35; G06N 5/02; G06N 20/00; G06N 5/022; G06Q 20/4014; G06Q 30/0276; G06V 30/414; G10L 13/10; G10L 15/005;

(Continued)

(56) References Cited

U.S. PATENT DOCUMENTS

| | | | |
|---|---|---|---|
| 5,615,296 A | 3/1997 | Stanford et al. | |
| 6,292,772 B1 * | 9/2001 | Kantrowitz | G06F 40/263 382/230 |

(Continued)

*Primary Examiner* — Gerald Gauthier
(74) *Attorney, Agent, or Firm* — K&L Gates LLP

(57) ABSTRACT

Systems, apparatuses, methods, and computer program products are disclosed for screening data instances based on a target text of a target corpus. A screening device analyzes a target corpus to generate at least two term dictionaries for the target corpus. The screening apparatus, based on a frequency of a term in the target corpus, determines a term weight for the term; for each data instance, determines term scores for the data instance and the target text based on the term weights; filters the data instances based on the term scores, to generate a short list of data instances; determines term similarity scores between each data instance of the short list and target text based on the term weights; and provides a data instance determined to likely correspond to the target text and an indication of the corresponding term similarity score(s). A term is a word or an n-gram.

20 Claims, 6 Drawing Sheets

(58) Field of Classification Search
CPC ....... G10L 15/063; G10L 15/16; G10L 15/26; H04L 63/08; H04L 63/145
See application file for complete search history.

(56) References Cited

U.S. PATENT DOCUMENTS

| | | | |
|---|---|---|---|
| 7,050,964 B2* | 5/2006 | Menzes | G06F 40/55 704/10 |
| 7,249,017 B2 | 7/2007 | Lucke et al. | |
| 7,477,238 B2* | 1/2009 | Fux | G06F 3/0237 345/169 |
| 7,555,428 B1* | 6/2009 | Franz | G06F 40/284 704/7 |
| 7,817,140 B2* | 10/2010 | Fux | G06F 3/0237 345/169 |
| 8,046,222 B2 | 10/2011 | Davis | |
| 8,155,950 B1* | 4/2012 | Bickerstaff | G06F 40/247 704/10 |
| 8,620,658 B2 | 12/2013 | Nakade et al. | |
| 8,719,006 B2* | 5/2014 | Bellegarda | G10L 13/10 704/10 |
| 8,849,665 B2 | 9/2014 | Bangalore et al. | |
| 9,020,806 B2 | 4/2015 | Zweig et al. | |
| 9,239,827 B2* | 1/2016 | Zhang | G06F 40/284 |
| 9,292,487 B1 | 3/2016 | Weber | |
| 9,436,760 B1 | 9/2016 | Tacchi et al. | |
| 9,552,412 B1 | 1/2017 | Lowe et al. | |
| 9,645,988 B1 | 5/2017 | Warren et al. | |
| 10,467,339 B1* | 11/2019 | Shen | G06F 40/247 |
| 10,585,989 B1 | 3/2020 | Ahmed et al. | |
| 10,728,277 B2* | 7/2020 | Dennison | H04L 63/145 |
| 10,990,760 B1* | 4/2021 | Monnett | G06F 40/295 |
| 11,030,539 B1* | 6/2021 | Arfa | G06F 40/295 |
| 11,132,509 B1* | 9/2021 | Pasko | G06F 18/214 |
| 11,263,277 B1 | 3/2022 | Podgorny et al. | |
| 11,392,651 B1* | 7/2022 | McClusky | G06F 40/295 |
| 11,501,067 B1* | 11/2022 | Naghshnejad | G06F 40/284 |
| 2002/0128821 A1* | 9/2002 | Ehsani | G10L 15/005 704/E15.04 |
| 2005/0108266 A1 | 5/2005 | Cao et al. | |
| 2005/0289141 A1 | 12/2005 | Baluja | |
| 2006/0047244 A1* | 3/2006 | Fux | G06F 3/0237 604/74 |
| 2006/0230350 A1 | 10/2006 | Baluja | |
| 2008/0015846 A1 | 1/2008 | Acero et al. | |
| 2008/0059151 A1 | 3/2008 | Chen et al. | |
| 2009/0024554 A1* | 1/2009 | Murdock | G06Q 30/0276 706/48 |
| 2009/0208955 A1 | 8/2009 | Robins et al. | |
| 2010/0070262 A1* | 3/2010 | Udupa | G06F 16/3344 704/7 |
| 2010/0125459 A1 | 5/2010 | Itoh et al. | |
| 2010/0290699 A1 | 11/2010 | Adam et al. | |
| 2010/0312545 A1* | 12/2010 | Sites | G06F 40/263 704/8 |
| 2011/0082878 A1 | 4/2011 | Nozaki | |
| 2012/0029910 A1 | 2/2012 | Medlock et al. | |
| 2012/0223889 A1 | 9/2012 | Medlock et al. | |
| 2013/0151533 A1 | 6/2013 | Udupa et al. | |
| 2013/0297638 A1 | 11/2013 | Hein et al. | |
| 2014/0230076 A1* | 8/2014 | Micucci | H04L 63/08 726/28 |
| 2014/0267045 A1 | 9/2014 | Grieves et al. | |
| 2014/0278349 A1 | 9/2014 | Grieves et al. | |
| 2014/0297267 A1 | 10/2014 | Spencer et al. | |
| 2014/0351760 A1 | 11/2014 | Skory et al. | |
| 2014/0372880 A1 | 12/2014 | Zhai et al. | |
| 2015/0006531 A1* | 1/2015 | Deshpande | G06F 16/783 707/737 |
| 2015/0100308 A1* | 4/2015 | Bedrax-Weiss | G06F 40/242 704/10 |
| 2015/0317069 A1 | 11/2015 | Clements et al. | |
| 2015/0347385 A1 | 12/2015 | Flor et al. | |
| 2015/0371664 A1 | 12/2015 | Bar-or et al. | |
| 2016/0012036 A1* | 1/2016 | Sun | G06F 40/284 704/10 |
| 2016/0041951 A1* | 2/2016 | Shinzato | G06F 40/117 704/10 |
| 2016/0092435 A1* | 3/2016 | Clarkson | G06F 16/374 704/10 |
| 2016/0336006 A1 | 11/2016 | Levit et al. | |
| 2016/0364608 A1* | 12/2016 | Sengupta | G06V 30/414 |
| 2017/0004128 A1 | 1/2017 | Yoon et al. | |
| 2017/0249384 A1 | 8/2017 | Kandylas et al. | |
| 2017/0323204 A1* | 11/2017 | Akbulut | G06F 16/3329 |
| 2018/0096397 A1 | 4/2018 | Goeldi et al. | |
| 2018/0114171 A1 | 4/2018 | Shady | |
| 2018/0173696 A1* | 6/2018 | Hosabettu | G06F 16/36 |
| 2018/0189857 A1 | 7/2018 | Wu et al. | |
| 2018/0204106 A1* | 7/2018 | Beller | G06F 40/295 |
| 2018/0239822 A1* | 8/2018 | Reshef | G06F 40/35 |
| 2018/0253153 A1 | 9/2018 | Primavesi et al. | |
| 2018/0260475 A1 | 9/2018 | Zhang | |
| 2018/0336183 A1* | 11/2018 | Lee | G06N 5/022 |
| 2019/0005049 A1* | 1/2019 | Mittal | G06F 16/3347 |
| 2019/0034407 A1 | 1/2019 | Hagiwara et al. | |
| 2019/0073997 A1* | 3/2019 | Millen | G10L 15/16 |
| 2019/0080627 A1* | 3/2019 | Dey | G06F 40/247 |
| 2019/0108276 A1 | 4/2019 | Kovacs et al. | |
| 2019/0188293 A1* | 6/2019 | Argyros | G06F 16/258 |
| 2019/0266250 A1* | 8/2019 | Toplyn | G10L 15/26 |
| 2020/0050618 A1 | 2/2020 | Prabhat et al. | |
| 2020/0050638 A1 | 2/2020 | Hancock | |
| 2020/0073882 A1* | 3/2020 | Guggilla | G06N 5/02 |
| 2020/0126533 A1* | 4/2020 | Doyle | G10L 15/063 |
| 2020/0311800 A1 | 10/2020 | Srinivasan et al. | |
| 2021/0124800 A1 | 4/2021 | Williams | |
| 2021/0294781 A1* | 9/2021 | Fernández Musoles | G06N 20/00 |

\* cited by examiner

Target Text: ABC Trading Company

Word Dictionary Components: ABC, Trading, Company

N-gram Dictionary Components: ABC, BC_, C_T, _Tr, Tra, rad, adi, din, ing, ng_, g_C, _Co, Com, omp, mpa, pan, any Example Data Instance A: ABCO Traders Inc., 123 Peachtree St, Atlanta, GA
Example Data Instance B: Atlanta Trading Company, 456 Other Peachtree St, Atlanta GA Word Match Score for Data Instance A: 0
Word Match Score for Data Instance B: $W_{trading}$ or $W_{company} \approx 0$ N-grams from N-gram Dictionary present in Data Instance A: ABC, _Tr, Tra, rad
N-grams from N-gram Dictionary present in Data Instance B: _Tr, Tra, rad, adi, din, ing, ng_, g_C, _Co, Com, omp, mpa, pan, any Greatest N-gram Weight for Data Instance A: $W_{ABC}$
Greatest N-gram Weight for Data Instance B: $W_{g\_C}$

FIG. 5

SYSTEMS AND METHODS FOR SCREENING DATA INSTANCES BASED ON A TARGET TEXT OF A TARGET CORPUS

CROSS REFERENCE TO RELATED APPLICATIONS

The present application is a continuation application of U.S. patent application Ser. No. 16/856,673, filed Apr. 23, 2020, which is hereby incorporated by reference in its entirety.

TECHNOLOGICAL FIELD

Example embodiments of the present disclosure relate generally to the screening of data instances based on target text of a target corpus. For example, example embodiments relate to identifying data instances that are likely to correspond to an entity identified by the target text.

BACKGROUND

In order to prevent financial crimes, such as money laundering, various organizations may generate watch lists. The watch lists may list suspect entities such that financial transactions corresponding to the suspect entities may be identified. However, transactions corresponding to suspect entities may not include an exact match of the entity names listed in the watch lists. Thus, basic queries of transactions based on the suspect entity names may miss a significant number of transactions corresponding to suspect entities and/or may include many false positives. Furthermore, the volume of transactions to be screened may be quite large (e.g., hundred per minute or more during peak volume times). Thus, manual screening of all transactions is not feasible.

BRIEF SUMMARY

Various embodiments provide methods, systems, apparatus, computer program products, and/or the like for screen data instances based on target texts of a target corpus. A watch list or other target corpus may comprise a plurality of watch list entries and/or target texts. Each target text may be a text or character string. Data instances may comprise text and/or character strings. A plurality of data instances may be efficiently screened to identify data instances that comprise text and/or character sequences that are likely to be a match for a target text of the target corpus. For example, the target text may be configured to identify an entity. The plurality of data instances may be efficiently screened to identify data instances that comprise text and/or character sequences that are likely to represent the entity identified by the target text.

For example, in various embodiments, a word dictionary is generated based on the words in the target texts of the target corpus. A word may be a sequence of characters that is separated from other sequences of characters in a text or character string by spaces and/or delimiters such as particular special characters (e.g., periods, dashes, commas, vertical lines, slashes, and/or the like). In various embodiments, an n-gram dictionary is generated based on n-grams generated from target texts of the target corpus. An n-gram is a sequence of n sequential characters from a text or character string. In various embodiments, n-grams are inclusive of the spaces within the text or character string. Based on the frequency with which a term is present in a target text and/or the frequency of the term within the term dictionary, a term weight is determined that is particular to the term and the target text. As used herein, a term is a word or an n-gram. For example, for each term in a target text, a term weight may be determined by how many times the term appears in the target text and how many times the term appears in the target corpus.

In various embodiments, a similarity score may be determined for one or more data instances. For example, a text or character string of a data instance may be analyzed to identify terms present in the data instance. In an example embodiment, a data instance vector may be generated that encodes the presence and/or absence of terms from a term dictionary in a data instance. For example, a word vector may be generated for a data instance that indicates which words from the word dictionary (determined based on the target corpus) are present in the data instance and which words from the word dictionary are not present in the data instance. Similarly, an n-gram vector may be generated for a data instance that indicates which n-grams from the n-gram dictionary are present in the data instance and which n-grams from the n-gram dictionary are not present in the data instance. Similarly, term vectors may be generated for a target text. The word vector generated for a target text and the word vector generated for a data instance will have the same number of elements (e.g., the number of words in the word dictionary). Similarly, the n-gram vector generated for a target text and the n-gram vector generated for a data instance will have the same number of elements (e.g., the number of n-grams in the n-gram dictionary). A similarity score for a target text and a data instance may then be determined by taking the dot product of a term vector for the target text and a corresponding term vector for the data instance. In various embodiments, the similarity score takes into account the term weights for the target text.

In various embodiments, a plurality of data instances may be evaluated and filtered such that similarity scores are only determined for data instances that are likely to be relevant to the target text. For example, in an example embodiment, a word score and/or an n-gram score may be determined for a data instance and/or each data instance of a plurality of data instances. Based on a threshold word score and/or a threshold n-gram score, instances that are not likely to be relevant may be filtered out. In an example embodiment, data instances that do not include at least one word or n-gram that matches a word or n-gram of the target text and that has a term weight greater than a term weight threshold value are determined to likely not be relevant to the target text and may be filtered out. By filtering out data instances that are not likely to be relevant to a target text prior to the generation of the term vectors for the data instance, computation expenses are conserved and a larger number of data instances may be screened using moderate computational resources.

Accordingly, the present disclosure sets forth systems, methods, apparatuses, and computer program products that efficiently identify data instances from a plurality of data instances that are most likely to correspond to a target text of a target corpus. For example, various embodiments provide high-quality matches. Various embodiments provide reports regarding the degree to which a data instance matches a target text. Since an algorithm that only looks for exact matches can potentially miss data instances that correspond to target texts (e.g., high likelihood of false negatives), various embodiments use fuzzy matching while efficiently reducing the likelihood of false positives. The reduced false positives while still maintaining a low likelihood of false negatives adds to the operability and scalability of various embodiments.

According to a first aspect, a method for screening data instances based on a target text of a target corpus. In an example embodiment, the method comprises analyzing, by a processor of a screening device, a target corpus to generate a word dictionary and an n-gram dictionary for the target corpus. The target corpus comprises the target text. The method further comprises based on a frequency of a word in the target corpus, determining, by the screening device, a word weight for the word; and based on a frequency of an n-gram in the target corpus, determining, by the screening device, an n-gram weight for the n-gram. The method further comprises for each data instance of plurality of data instances, determining, by the screening device, a word score and an n-gram score for the data instance and the target text based on the determined word and n-gram weights; and filtering, by the screening device, the plurality of data instance based on the word score and the n-gram score corresponding to each data instance, to generate a short list of data instances. The method further comprises determining, by the screening device, word and n-gram similarity scores between each data instance of the short list and target text based on the determined word and n-gram weights; and providing, by the screening device, at least one data instance of the short list and an indication of a corresponding similarity score.

According to another aspect, an apparatus for screening data instances based on a target text of a target corpus. In an example embodiment, the apparatus comprises processor circuitry configured to analyze a target corpus to generate a word dictionary and an n-gram dictionary for the target corpus, the target corpus comprising the target text; based on a frequency of a word in the target corpus, determine a word weight for the word; based on a frequency of an n-gram in the target corpus, determine an n-gram weight for the n-gram; for each data instance of plurality of data instances, determine a word score and an n-gram score for the data instance and the target text based on the determined word and n-gram weights; filter the plurality of data instance based on the word score and the n-gram score corresponding to each data instance, to generate a short list of data instances; determine word and n-gram similarity scores between each data instance of the short list and target text based on the determined word and n-gram weights; and provide at least one data instance of the short list and an indication of a corresponding similarity score.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

FIG. 5 provides an illustration of determining a word score and an-gram score for two example data instances and an example target text, in accordance with an example embodiment described herein.

DETAILED DESCRIPTION

Figure 1:
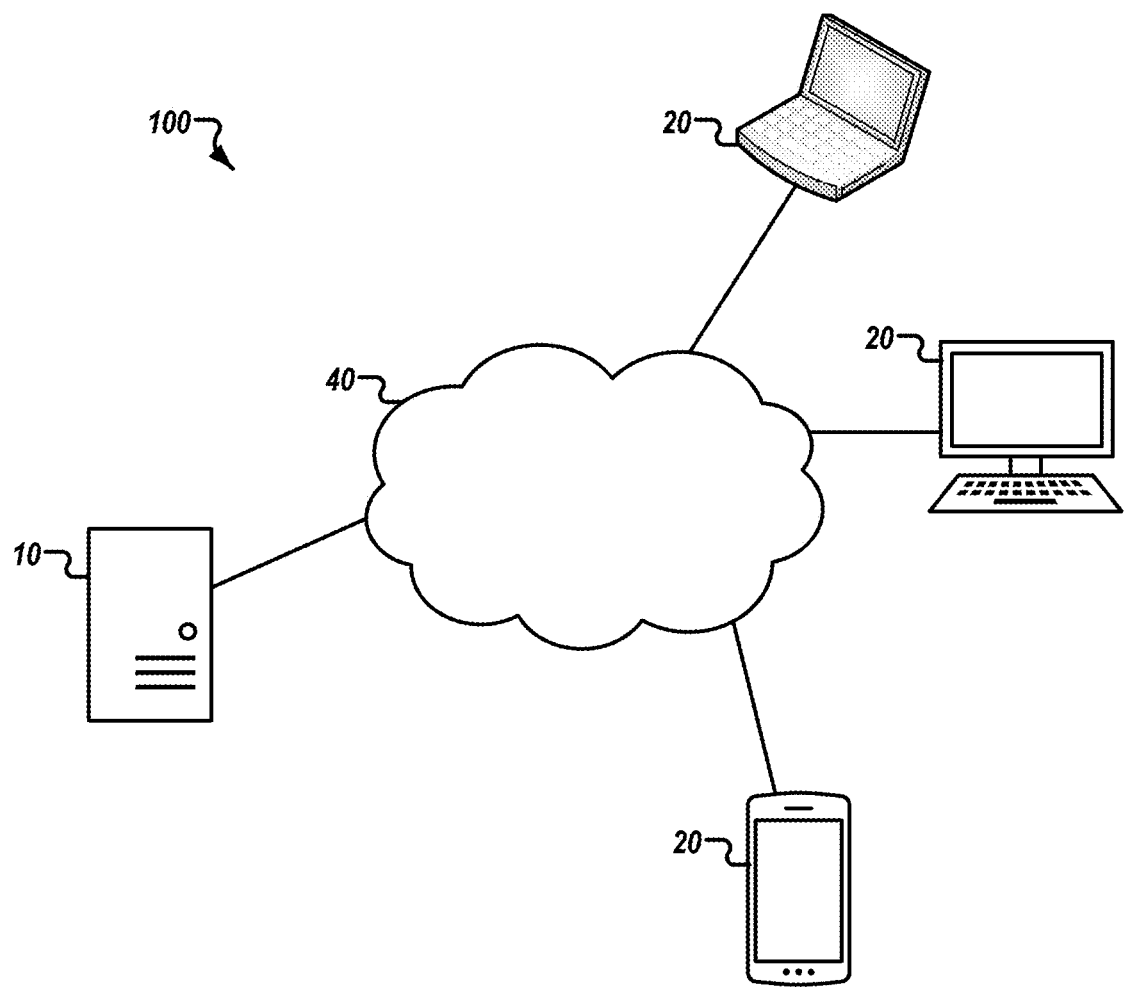
FIG. 1 is a block diagram showing an example architecture of one embodiment described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Where the specification states that a particular component or feature "may," "can," "could," "should," "would," "preferably," "possibly," "typically," "optionally," "for example," "often," "exemplary," or "might" (or other such language) be included or have a characteristic, that particular component or feature is not required to be included or to have the characteristic. Such terminology is intended to convey that the particular component or feature is included in some embodiments while excluded in others, or has the characteristic in some embodiments while lacking the characteristic in others.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Overview

Various embodiments provide methods, systems, apparatuses, and/or computer program products for the efficient screening of data instances to identify data instances that are likely to correspond to a target text of a target corpus. In an example embodiment, a target corpus is a watch list, a target text is a watch list entry, and the data instances are transactions (e.g., data records corresponding to transactions). Each target text may be a text or character string. A target corpus may be a list of, array of, and/or comprise a plurality of target texts. A data instance may comprise a text and/or character string. A plurality of data instances may be efficiently screened (e.g., by a screening device) to identify data instances that comprise text and/or character sequences that are likely to be a match for a target text of the target corpus. For example, the target text may be configured to identify an entity. The plurality of data instances may be efficiently screened to identify data instances that comprise text and/or character sequences that are likely to represent the entity identified by the target text.

For example, in various embodiments, a word dictionary is generated based on the words in the target texts of the target corpus. A word may be a sequence of characters that is separated from other sequences of characters in a text or character string by spaces and/or delimiters such as particular special characters (e.g., periods, dashes, commas, vertical lines, slashes, and/or the like). For example the text string "patent application" comprises the words "patent" and "application" which are separated by a space. In various embodiments, an n-gram dictionary is generated based on n-grams generated from target texts of the target corpus. An n-gram is a sequence of n sequential characters from a text or character string. In various embodiments, n-grams are inclusive of the spaces within the text or character string. For example, the text string "patent application" comprises then=4 n-grams "pate," "aten," "tent," "ent_," "nt_a,", "t_ap," "_app," "appl," "ppli," "plic," "lica," "icat," "cati," "atio," and "tion," where the underscore "_" indicates a space.

In various embodiments, term weights are determined for each term. As used herein, the phrase "term" refers to a word or n-gram. For example, a word weight is determined for each word in each target text and an n-gram weight is determined for each n-gram in each target text. The term weight for a particular term in a corresponding target text is determined based on the frequency with which the particular term is present in the corresponding target text and/or the frequency of the particular term within the term dictionary. For example, for each term in a target text, a term weight may be determined by how many times the term appears in the target text and how many times the term appears in the target corpus.

In various embodiments, a similarity score may be determined for one or more data instances. For example, a text or character string of a data instance may be analyzed to identify terms (e.g., words and/or n-grams) present in the data instance. In an example embodiment, a data instance vector may be generated that encodes the presence and/or absence of terms from a term dictionary in a data instance. For example, a word vector may be generated for a data instance that indicates which words from the word dictionary (generated based on the target corpus) are present in the data instance and which words from the word dictionary are not present in the data instance. Similarly, an n-gram vector may be generated for a data instance that indicates which n-grams from the n-gram dictionary are present in the data instance and which n-grams from the n-gram dictionary are not present in the data instance. Similarly, term vectors may be generated for a target text. The word vector generated for a target text and the word vector generated for a data instance will have the same number of elements (e.g., the number of words in the word dictionary). Similarly, the n-gram vector generated for a target text and the n-gram vector generated for a data instance will have the same number of elements (e.g., the number of n-grams in the n-gram dictionary). A similarity score for a target text and a data instance may then be determined by taking the dot product of a term vector for the target text and a corresponding term vector for the data instance. In various embodiments, the similarity score takes into account the term weights for the target text.

In various embodiments, a plurality of data instances may be evaluated and filtered such that similarity scores are only determined for data instances that are likely to be relevant to the target text. For example, in an example embodiment, a word score and/or an n-gram score may be determined for a data instance and/or each data instance of a plurality of data instances. Based on a threshold word score and/or a threshold n-gram score, instances that are not likely to be relevant may be filtered out. In an example embodiment, data instances that do not include at least one word or n-gram that matches a word or n-gram of the target text and that has a term weight greater than a term weight threshold value are determined to likely not be relevant to the target text and may be filtered out. By filtering out data instances that are not likely to be relevant to a target text prior to the generation of the term vectors for the data instance, computation expenses are conserved and a larger number of data instances may be screened using moderate computational resources.

Accordingly, the present disclosure sets forth systems, methods, apparatuses, and computer program products that accurately and computationally efficiently screen a plurality of data instances to identify data instances that are likely to corresponding to target texts of a target corpus. Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which embodiments of the present disclosure may operate to screen a plurality of data instances to identify data instances that are likely to corresponding to target texts of a target corpus and/or to provide interactive user interfaces (IUis) configured for providing information/data regarding data instances identified as being likely to correspond to target texts. As illustrated, the example environment 100 may include one or more screening devices 10 and one or more user computing devices 20. The one or more screening devices 10 and/or one or more user computing devices 20 may be in electronic communication with, for example, one another over the same or different wireless or wired networks 40. For example, a user computing device 20 may provide (e.g., transmit, submit, and/or the like) a target corpus and/or a request for information/data regarding data instances that are likely to correspond to target texts of a target corpus via one or more wireless or wired networks 40 such that the target corpus and/or request is received by a screening device 10. For example, a screening device 10 may provide (e.g., transmit) information/data regarding data instances that are likely to correspond to target texts of a target corpus via one or more wireless or wired networks 40 such that the information/data is received by a user computing device 20.

Figure 2:
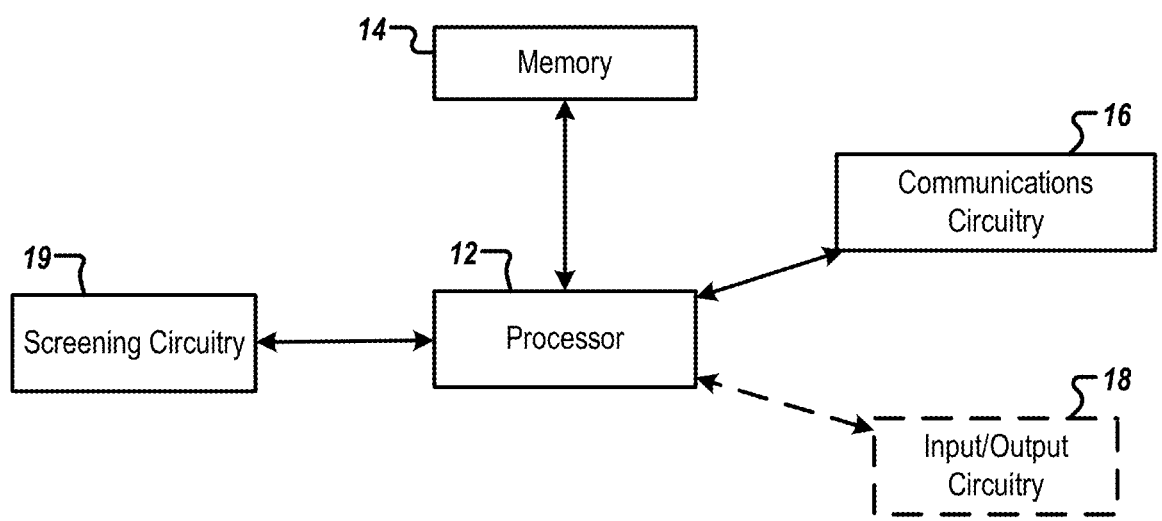
FIG. 2 is a block diagram of a screening device that may be specifically configured in accordance with an example embodiment described herein.

The one or more screening devices 10 may be embodied as one or more servers, such as that described below in connection with FIG. 2. The one or more screening devices 10 may further be implemented as local servers, remote servers, cloud-based servers (e.g., cloud utilities), or any combination thereof. The one or more screening devices 10 may receive, process, generate, and transmit data, signals, and electronic information to facilitate the operations of screening data instances to identify data instances that are likely to correspond to a target text. In various embodiments, a screening device 10 may store and/or be in communication with one or more databases. In an example embodiment, the one or more databases may be embodied as one or more data storage devices, such as a Network Attached Storage (NAS) device or devices, or as one or more separate databases or servers. The one or more databases may store information accessed by the screening device 10 to facilitate the operations of screening data instances to identify data instances that are likely to correspond to a target text. For example, the one or more databases may store control signals, device characteristics, and access credentials and/or the like for one or more of the user computing devices 20, one or more target corpora, a plurality of data instances (e.g., in a database or other data storage), and/or the like. The term target corpus is used herein to encompass a single target corpus and/or a plurality of target corpora. For example, a target corpus may correspond to a single watch list or a plurality of watch lists, in an example embodiment.

Figure 3:
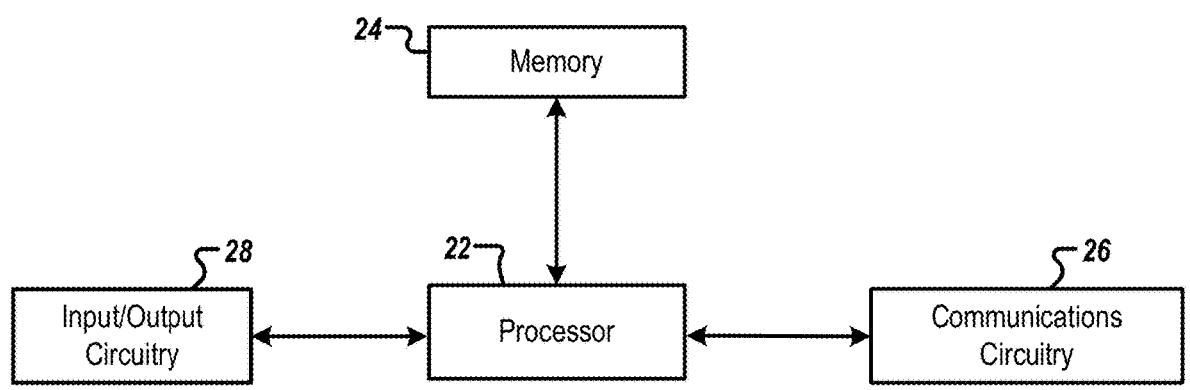
FIG. 3 is a block diagram of a user computing device that may be specifically configured in accordance with an example embodiment described herein.

The one or more user computing devices 20 may be embodied by any computing devices known in the art, such as those described below in connection with FIG. 3. The screening device 10 may receive information from, and transmit information to, the one or more user computing devices 20. For example, the screening device 10 may receive a target corpus provided by a first user computing device 20. For example, the screening device may provide information/data regarding data instances that are determined to be likely to correspond to a target text of a target corpus such that a user computing device 20 receives the information/data (e.g., for use by a machine user and/or for provision to a human user via an IUI). It will be understood that in some embodiments, the one or more user computing devices 20 need not themselves be independent devices but may be peripheral devices, client devices, and/or the like communicatively coupled to other computing devices.

Exemplary Computing Devices

The screening device 10 described with reference to FIG. 1 may be embodied by one or more computing devices or servers, such as the example screening device 10 shown in FIG. 2. As illustrated in FIG. 2, the screening device 10 may include processing circuitry 12, memory 14, communications circuitry 16, input-output circuitry 18, and screening circuitry 19, each of which will be described in greater detail below. In some embodiments, the screening device 10 may further comprise a bus (not expressly shown in FIG. 2) for passing information between various components of the screening device. The screening device 10 may be configured to execute various operations described above in connection with FIG. 1 and below in connection with FIGS. 4-6.

In some embodiments, the processor 12 (and/or co-processor or any other processing circuitry assisting or otherwise associated with the processor) may be in communication with the memory 14 via a bus for passing information among components of the apparatus. The processor 12 may be embodied in a number of different ways and may, for example, include one or more processing devices configured to perform independently. Additionally or alternatively, the processor may include one or more processors configured in tandem via a bus to enable independent execution of software instructions, pipelining, and/or multithreading. The use of the terms "processor" or "processing circuitry" may be understood to include a single core processor, a multi-core processor, multiple processors of the screening device 10, remote or "cloud" processors, or any combination thereof.

In an example embodiment, the processor 12 may be configured to execute software instructions stored in the memory 14 or otherwise accessible to the processor. Alternatively or additionally, the processor 12 may be configured to execute hard-coded functionality. As such, whether configured by hardware or software methods, or by a combination of hardware with software, the processor 12 may represent an entity (e.g., physically embodied in circuitry) capable of performing operations according to an embodiment of the present invention while configured accordingly. Alternatively, as another example, when the processor 12 is embodied as an executor of software instructions, the software instructions may specifically configure the processor 12 to perform the algorithms and/or operations described herein when the software instructions are executed.

Memory 14 is non-transitory and may include, for example, one or more volatile and/or non-volatile memories. In other words, for example, the memory 14 may be an electronic storage device (e.g., a computer readable storage medium). The memory 14 may be configured to store information, data, content, applications, software instructions, or the like, for enabling the apparatus to carry out various functions in accordance with example embodiments contemplated herein. For example, in an example embodiment, the memory 14 stores one or more databases. For example, the one or more databases may include a database storing one or more target corpuses (e.g., watch lists).

The communications circuitry 16 may be any means such as a device or circuitry embodied in either hardware or a combination of hardware and software that is configured to receive and/or transmit data from/to a network and/or any other device, circuitry, or module in communication with the screening device 10. In this regard, the communications circuitry 16 may include, for example, a network interface for enabling communications with a wired or wireless communication network. For example, the communications circuitry 16 may include one or more network interface cards, antennas, buses, switches, routers, modems, and supporting hardware and/or software, or any other device suitable for enabling communications via a network 40. Additionally or alternatively, the communication interface 16 may include the circuitry for causing transmission of such signals to a network or to handle receipt of signals received from a network.

In some embodiments, the screening device 10 may include input/output circuitry 18 in communication configured to provide output to a user and, in some embodiments, to receive an indication of user input. The input/output circuitry 18 may comprise a user interface, such as a display, and may further comprise the components that govern use of the user interface, such as a web browser, mobile application, dedicated client device, or the like. In some embodiments, the input/output circuitry 18 may additionally or alternatively include a keyboard, a mouse, a touch screen, touch areas, soft keys, a microphone, a speaker, and/or other input/output mechanisms. The input/output circuitry 18 may utilize the processor 12 to control one or more functions of one or more of these user interface elements through software instructions (e.g., application software and/or system software, such as firmware) stored on a memory (e.g., memory 14) accessible to the processor 12.

In addition, the screening device 10 further comprises screening circuitry 19, which includes hardware components designed for generating term dictionaries and/or term weights based on a target corpus, determining term scores for data instance-target text pairs, filtering a plurality of data instances based on corresponding term scores, determining term similarity scores for data instance-target text pairs, and identifying data instances that are likely to correspond to a target text. The screening circuitry 19 may utilize processor 12, memory 14, or any other hardware component included in the screening device 10 to perform these operations, as described in connection with FIGS. 4-6 below. The screening circuitry 19 may further utilize communications circuitry 16 to receive callable instruments values requests and/or provide callable instruments values (e.g., in response to a request therefor), or may otherwise utilize processor 12 and/or memory 14 to access information/data and/or executable instructions (e.g., software) used to determine callable instruments values and/or to store determined callable instruments values, and/or the like. In an example embodiment, the functionality described herein as being performed by the screening circuitry 19 is performed through the execution executable instructions by the processor 12. In an example embodiment, the screening circuitry 19 comprises one or more graphical processing units (GPUs).

Although these components 12-19 may in part be described using functional language, it will be understood that the particular implementations necessarily include the use of particular hardware. It should also be understood that certain of these components 12-19 may include similar or common hardware. For example, the screening circuitry 19 may at times leverage use of the processor 12 or memory 14, but duplicate hardware is not required to facilitate operation of these distinct components of the screening device 10 (although duplicated hardware components may be used in some embodiments, such as those in which enhanced parallelism may be desired). The use of the term "circuitry" as used herein with respect to components of the screening device 10 therefore shall be interpreted as including the particular hardware configured to perform the functions associated with the particular circuitry described herein. Of course, while the term "circuitry" should be understood broadly to include hardware, in some embodiments, the term "circuitry" may refer also to software instructions that configure the hardware components of the screening device 10 to perform their various functions.

To this end, each of the communications circuitry 16, input/output circuitry 18, and screening circuitry 204 may include one or more dedicated processors, specially configured field programmable gate arrays (FPGA), and/or application specific interface circuit (ASIC) to perform its corresponding functions, these components may additionally or alternatively be implemented using a processor (e.g., processor 12) executing software stored in a memory (e.g., memory 14). In this fashion, the communications circuitry 16, input/output circuitry 18, and screening circuitry 19 are therefore implemented using special-purpose components implemented purely via hardware design or may utilize hardware components of the screening device 10 that execute computer software designed to facilitate performance of the functions of the communications circuitry 16, input/output circuitry 18, and screening circuitry 19.

The user computing device 20 described with reference to FIG. 1 may be embodied by one or more computing devices, personal computers, desktop computers, client devices (e.g., of the screening device 10), and/or mobile devices, such as the example user computing device 20 shown in FIG. 3. The illustrated example user computing device 20 includes processing circuitry and/or processor 22, memory 24, communications circuitry 26, and input-output circuitry 28, each of which is configured to be similar to the similarly named components described above in connection with FIG. 2. In various embodiments, the processor 22, memory 24, and input-output circuitry 28 are configured to provide an IUI configured for user interaction (e.g., via the input-output circuitry 28). For example, the IUI may be configured to receive user input initiating the display of an IUI configured to provide information/data regarding one or more data instances that have been determined to likely corresponding to a target text.

In some embodiments, various components of the screening device 10 and/or user computing device 20 may be hosted remotely (e.g., by one or more cloud servers) and thus need not physically reside on the corresponding computing device 10, 20. Thus, some or all of the functionality described herein may be provided by third party circuitry. For example, a given computing device 10, 20 may access one or more third party circuitries via any sort of networked connection that facilitates transmission of data and electronic information between the computing device 10, 20 and the third party circuitries. In turn, that computing device 10, 20 may be in remote communication with one or more of the other components describe above as comprising the computing device 10, 20.

As will be appreciated based on this disclosure, example embodiments contemplated herein may be implemented by a screening device 10 and/or user computing device 20. Furthermore, embodiments may take the form of a computer program product on at least one non-transitory computer-readable storage medium (e.g., memory 14, 24) storing software instructions. Any suitable non-transitory computer-readable storage medium may be utilized, some examples of which are non-transitory hard disks, CD-ROMs, flash memory, optical storage devices, and magnetic storage devices. It should be appreciated, with respect to certain screening devices 10 as described in FIG. 2 or user computing devices 20 as described in FIG. 3, that loading the software instructions onto a computer or apparatus produces a special-purpose machine comprising the means for implementing various functions described herein.

Having described specific components of example screening devices 10 and user computing devices 20, example embodiments are described below in connection with a series of flowcharts.

Example Operation of a Screening Device

In various embodiments, a screening device 10 is configured to access a target corpus. The target corpus comprises a plurality of target texts. Each target text is a text or character string. In various embodiments, a screening device 10 is configured to generate at least two term dictionaries from the target corpus. In various embodiments, a screening device is configured to determine term weights for each (unique) term of each target text.

In various embodiments, a screening device 10 may be configured to determine one or more term scores for each of a plurality of data instances for each target text of the target corpus. In various embodiments, a screening device 10 may be configured to filter the plurality of data instances based on the corresponding term scores to determine groups or short lists of data instances that are most likely to be relevant to a target text.

In various embodiments, a screening device 10 may be configured to determine one or more term similarity scores for data instances of the short list of a target text and the corresponding target text. In various embodiments, a screening device 10 may be configured to determine which data instances of the short list of a target text are most likely to correspond to the target text based on at least one of the corresponding term similarity scores. In various embodiments, a screening device 10 may be configured to provide information/data regarding the data instances determined to be likely to correspond to the target text such that a user computing entity 20, for example, receives the information/data.

In various embodiments, the user computing entity 20 may provide the information/data regarding the data instances determined to be likely to correspond to the target text to a human user via an IUI. In various embodiments, the user computing entity 20 and/or screening device 10 may provide the information/data regarding the data instances determined to be likely to correspond to the target text to a machine user configured to automatically flag assets corresponding to the data instance and/or perform other automatic functions corresponding to the data instances determined to be likely to correspond to the target text.

Figure 4:
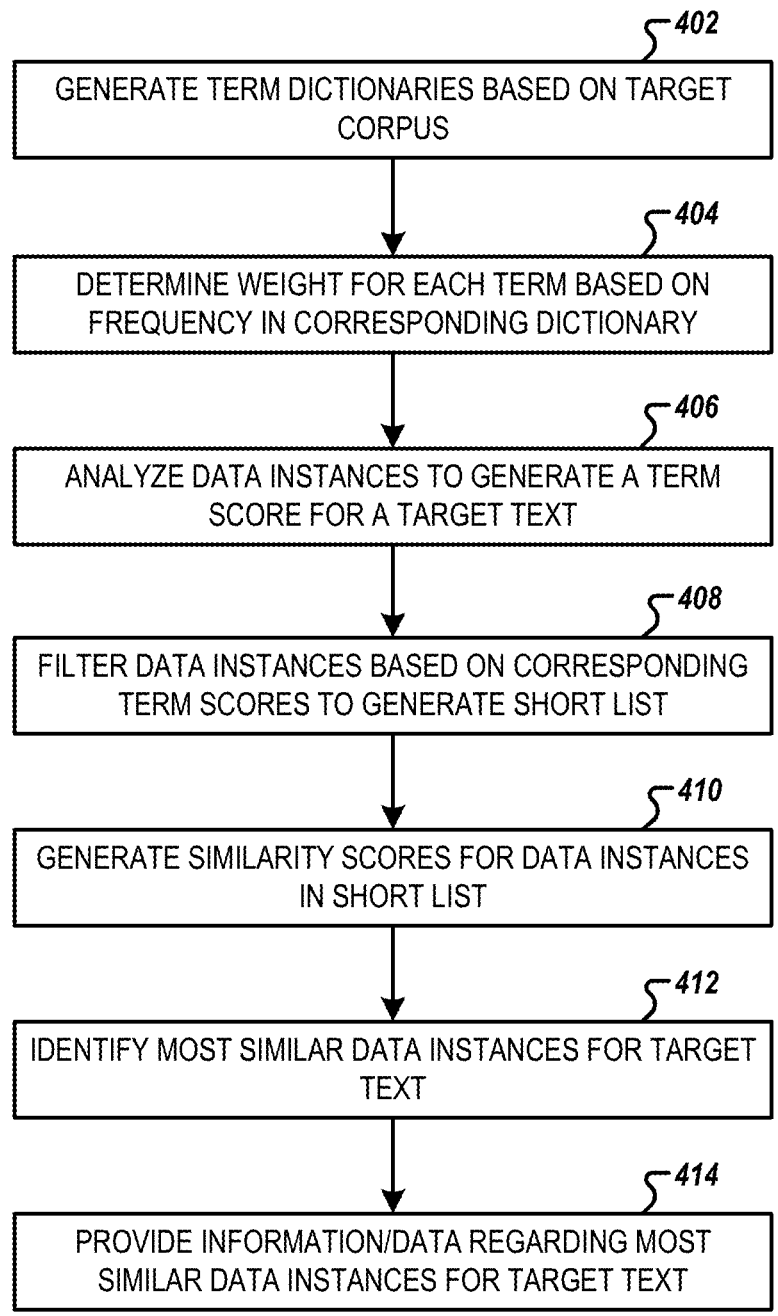
FIG. 4 is a flowchart illustrating operations performed, such as by the screening device of FIG. 2 to screen a plurality of data instances to identify data instances that are likely to correspond to a target text of a target corpus, in accordance with an example embodiment described herein.

FIG. 4 provides a flowchart illustrating various functions performed, for example, by a screening device 10 to screen a plurality of data instances to identify data instances that are likely to correspond to a target text of a target corpus. Starting at step/operation 402, a screening device 10 accesses a target corpus and generates at least two term dictionaries based on the target corpus. In various embodiments, a screening device 10 comprises means, such as processor 12, memory 14, communications circuitry 16, screening circuitry 19, and/or the like for accessing a target corpus and generating at least two term dictionaries based on the target corpus.

One of the term dictionaries is a word dictionary that contains all of the words within the target corpus (e.g., within each of the target texts of the target corpus). As noted above, the screening device 10 identifies words as sequences of characters in a text or character string that are separated from other sequences of characters within the text or character string by spaces and/or delimiters such as particular special characters (e.g., periods, dashes, commas, vertical lines, slashes, and/or the like). For example, each word of each target text may be extracted to generate the word dictionary. In an example embodiment, repeat and/or duplicate words in the word dictionary may be removed such that the word dictionary comprises a list and/or the like of the unique words in the target texts of the target corpus.

Another of the two or more term dictionaries is an n-gram dictionary that contains all of the n-grams for a particular (integer) value of n within the target texts of the target corpus. In an example embodiment, multiple n-gram dictionaries may be generated with different values of n. Each n-gram in an n-gram dictionary corresponds to the same value of n. In various embodiments, n is an integer greater than one. In various embodiments, n is two, three, four, or five. As noted above, a screening device identifies an n-gram as a sequence of n sequential characters from a text or character string. In various embodiments, n-grams are inclusive of the spaces within the text or character string. For example, each n-gram of each target text may be extracted to generate the n-gram dictionary. In an example embodiment, repeat and/or duplicate n-grams in the n-gram dictionary may be removed such that the n-gram dictionary comprises a list and/or the like of the unique n-grams in the target texts of the target corpus.

At step/operation 404, the screening device 10 determines term weights for each term of a target text. In an example embodiment, a term weight is determined for each unique term of each target text. For example, a screening device 10 may comprise means, such as processor 12, memory 14, screening circuitry 19, and/or the like, for determining term weights for each term of a target text. In an example embodiment, term weights are determined that correspond to each dictionary. For example, if a word dictionary and an n-gram dictionary are generated at step/operation 402, a word weight for each (unique) word of a target text may be determined and an n-gram weight for each (unique) n-gram of the target text may be determined. For example, the unique words of the target text "Field-to-Farm Farm" are the words "field," "to," and "farm." The term weight for a particular term of a particular target text within the target corpus may be determined based on the frequency with which the particular term is present in the particular target text and/or the frequency of the particular term within the corresponding term dictionary. For example, for each term in a target text, a term weight may be determined based on how many times the term appears in the target text and how many times the term appears in the target corpus.

Figure 6:
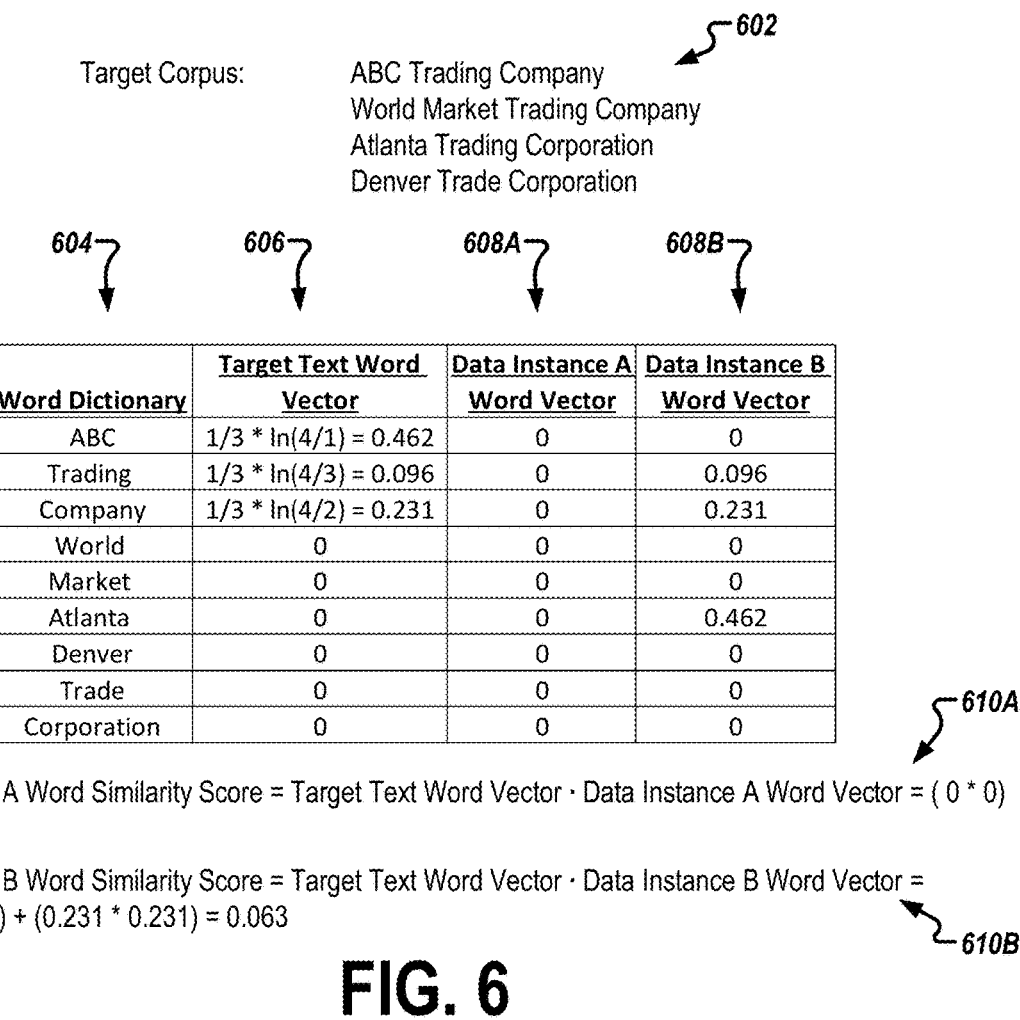
FIG. 6 provides an illustration of determining a word similarity score for two example data instances and an example target text of an example target corpus, in accordance with an example embodiment described herein.

In an example embodiment, a term weight may be determined based on term frequency-inverse document frequency (tf-idf). For example, in an example embodiment, the term weight $W_t$ for a term t in a target text may be determined based on $W_t = TF(t) \cdot IDF(t)$, where $$TF(t) = \frac{\text{number of times t appears in the target text}}{\text{number of terms in the target text}}$$

and $$IDF(t) = \ln\left(\frac{\text{number of target texts in the target corpus}}{\text{number of target texts in the target corpus in which t appears}}\right),$$

in an example embodiment. For example, FIG. 6 provides an example (trivial) target corpus 602 comprising the target texts "ABC Trading Company," "World Market Trading Company," "Atlanta Trading Corporation," and "Denver Trade Corporation" and the Target Text Word Vector column shows the determination of the word weights for the target text "ABC Trading Company" based on the example target corpus using the tf-idf as the word weight. As should be understood, various embodiments may use different term weights as alternatives to the tf-idf that take into account the frequency with which the particular term is present in the particular target text and/or the frequency of the particular term within the corresponding term dictionary.

At step/operation 406, the screening device 10 analyzes the plurality of data instances to determine term scores for each data instance for a target text. For example, the screening device 10 may comprise means, such as processor 12, memory 14, screening circuitry 19, and/or the like, for analyzing the plurality of data instances to determine term scores for each data instance for a target text. For example, a word score and an n-gram score may be determined for first data instance and a first target text. In an example embodiment, determining a term score for a first data instance and a first target text comprises determining which, if any, terms that are present in the first target text are present in the first data instance. In an example embodiment, determining a term score for a first data instance and first target text comprises determining the term that is present in the first target text that is present in the first data instance that has the highest or greatest term weight. In an example embodiment, the term weight that is the highest or greatest term weight associated with a term that is present in both the first target text and the first data instance is assigned as the term score for the first data instance corresponding to the first target text. In an example embodiment, the term score is a binary value (e.g., yes or no; True or False). For example, the term score for a first target text and a first data instance may be set to "yes" or "True" when it is determined that at least one term that is present in the first target text is present in the first data instance and that the term weight of the at least one term is equal to or greater than a threshold weight. In an example embodiment, the threshold weight is approximately one standard deviation more than the mean of the term weight distribution. For example, in an example embodiment, the term score is a flag.

FIG. 5 illustrates an example of determining a word term score and an n-gram term score for two example data instances (data instance A 508A and data instance B 508B) for an example target text 502. In this example, the example target text 502 contributes the word dictionary components 504 "ABC," "trading," and "company" and contributes the n-gram dictionary components 506 "ABC," "BC_," "CT" "Tr" "Tra," "rad," "adi," "din," "ing" "ng_," "g_C," "_Co," "Corn," "omp" "mpa," "pan," and "any." Example data instance A 508A does not contain any of the word dictionary components 504 that are present in the example target text 502. Thus, the word score 510A for example data instance 508A is zero. Example data instance B 508B contains the word dictionary components 504 that are present in the example target text 502 "trading" and "company." However, the words "trading" and "company" occur with a high frequency in the target texts of the target corpus. Thus, the word weights corresponding to "trading" and "company" for the target text are quite low and/or small, thus the word score 510B for data instance B is quite low and/or small. Both example data instances A and B 508A, 508B contain a plurality 512A, 512B of n-gram dictionary components 506 that are present in the example target text 502. In this example embodiment, the largest and/or greatest n-gram weight 514A of an n-gram present in the example data instance A 508A and present in the example target text 502 is $W_{ABC}$. In this example embodiment, the largest and/or greatest n-gram weight 514B of an n-gram present in the example data instance B 508B and present in the example target text 502 is $W_{g\_C}$.

Thus, in an example embodiment, a word score for a data instance and a target text comprises identifying words that are present in both the data instance and the target text, determining which of the words that are present in both the data instance and the target text has the largest word weight, and setting the largest word weight of the words that are present in both the data instance and the target test as the word score for the data instance. Similarly, in an example embodiment, an ngram score for a data instance and a target text comprises identifying n-grams that are present in both the data instance and the target text, determining which of the n-grams that are present in both the data instance and the target text has the largest n-gram weight, and setting the largest n-gram weight of the n-grams that are present in both the data instance and the target test as the n-gram score for the data instance.

Continuing with FIG. 4, at step/operation 408, the screening device 10 may filter the plurality of data instances to generate a short list for each target text of the target corpus based on the word and/or n-gram scores corresponding to each data instance and target text. For example, the screening device 10 may comprise means, such as processor 12, memory 14, screening circuitry 19, and/or the like, for filtering the plurality of data instances to generate a short list for a target text based on the word and/or n-gram scores corresponding to teach data instance and the target text. For example, when the word score corresponding to a data instance and a target text is greater than a word match threshold, the data instance is included in the short list for the target text. For example, when the n-gram score corresponding to a data instance and a target text is greater than an n-gram match threshold, the data instance is included in the short list for the target text. For example, when both the word score is less than the word match threshold and the n-gram score is less than the n-gram match threshold, the data instance is not included in the short list for the target text.

In various embodiments, the word match threshold and/or n-gram match threshold is specific to the target text. For example, the average word weight (e.g., mean word weight $\mu_{word}$) for the words of a target text may be determined and a representative measure of spread of the distribution of word weights (e.g., standard deviation of the word weights $\sigma_{word}$) for words of the target text may be determined. In an example embodiment, the word match threshold may be determined based on the average word weight and/or the representative measure of spread of the distribution of word weights. For example, in an example embodiment, the word match threshold $T_{word}$ is the sum of the mean word weight μword and the standard deviation of the word weights $\sigma_{word}$ (e.g., $T_{word}=\mu_{word}+\sigma_{word}$). In another example, the average n-gram weight (e.g., mean n-gram weight μn-gram) for the n-grams of a target text may be determined and a representative measure of spread of the distribution of n-gram weights (e.g., standard deviation of then-gram weights σn-gram) for n-grams of the target text may be determined. In an example embodiment, the n-gram match threshold may be determined based on the average n-gram weight and/or the representative measure of spread of the distribution of n-gram weights. For example, in an example embodiment, the n-gram match threshold Tn-gram is the sum of the mean n-gram weight μn-gram and the standard deviation of the n-gram weights $\sigma_{n\text{-}gram}$ (e.g., $T_{n\text{-}gram}=\mu_{n\text{-}gram}+\sigma_{n\text{-}gram}$).

At step/operation 410, the screening device 10 may determine term similarity scores for each data instance in the short list of a target text. For example, the screening device 10 may comprise means, such as processor 12, memory 14, screening circuitry 19, and/or the like, for determining term similarity scores for data instances on the short list of a target text. For example, for each data instance on a short list for a target text, term similarity scores for the data instance and the target text may be determined. For example, for a data instance on the short list of a target text, a word similarity score and an n-gram similarity score may be determined for the data instance and the target text. In various embodiments, a term similarity score indicates how similar a data instance and a target text are based on terms present in both the data instance and the similarity score.

In an example embodiment, determining a term similarity score for a data instance and corresponding to a target text comprises identifying the terms that are present in the data instance that are present in the target text and/or in the corresponding term dictionary. In an example embodiment, determining a term similarity score for a data instance and corresponding to a target text comprises generating a term vector that encodes which terms in the term dictionary are present in the data instance and which terms in the term dictionary are not present in the data instance. In an example embodiment, determining a term similarity score for a data instance and corresponding to a target text comprises taking a dot product between a term vector that encodes which terms of the corresponding term dictionary are and which are not present in the data instance and a term vector corresponding to the target text. In various embodiments, the result of the dot product of the term vector corresponding to the data instance and the term vector corresponding to the target text is assigned as the term similarity score for the data instance and corresponding to the target text.

FIG. 6 illustrates an example of determining word similarity scores for example data instance A 508A and example data instance B 508B corresponding to the example target text 502 which is part of the example (trivial) target corpus 602. Then-gram similarity scores may be determined in a similar manner based on the n-gram dictionary for the target corpus 602 and the n-gram vectors for the target text and each data instance. A target text word vector 606 is generated that encodes which words in the word dictionary 604 are present in the target text. For example, the target text word vector 606 comprises as many components and/or elements as there are (unique) words in the word dictionary 604. The components and/or elements of the target text word vector 606 that correspond to words in the word dictionary 604 that are present in the target text are populated with the corresponding word weight. The components and/or elements of the target text word vector 606 that correspond to words in the word dictionary 604 that are not present in the target text are populated with a small value (e.g., zero or another small value that is smaller than the corresponding word match threshold, for example). The components and/or elements of the data instance A word vector 608A that correspond to words in the word dictionary 604 that are present in data instance A 508A are populated with the corresponding word weight for the target text 502, the value 1, and/or the like. The components and/or elements of the data instance A word vector 608A that correspond to words in the word dictionary 604 that are not present in data instance A 508A are populated with a small value (e.g., zero or another small value that is smaller than the corresponding word match threshold, for example). The data instance B word vector 608B is generated, determined, and/or the like in a similar manner.

The data instance A word similarity score 610A is then determined by taking the dot product between the target text word vector 606 and the data instance A word vector 608A. Similarly, the data instance B word similarity score 610B is then determined by taking the dot product between the target text word vector 606 and the data instance B word vector 608B. N-gram similarity scores may be determined in a similar manner using the n-gram dictionary for the target corpus, the corresponding n-gram weights for the target text n-gram vectors and data instance n-gram vectors. For example, in various embodiments, a word similarity score and/or an n-gram similarity score is a tf-idf calculation. As can be seen by comparing the determination of the word similarity score for data instance A 508A in FIG. 6, using a word similarity score alone would not be sufficient to identify data instance A as a possible match for the target text "ABC Trading Company." However, using the n-gram similarity score may yield a match between data instance A 508A and the target text "ABC Trading Company" (e.g., based on the weight of the n-gram ABC based on the n-gram dictionary). For example, then-gram similarity score for data instance A may be greater than the n-gram similarity score and/or the word similarity score for data instance B, even though the word similarity score of data instance A is zero.

Thus, in an example embodiment, determining a word similarity score for a data instance on a short list for a target text and the target text comprises generating a word vector indicating which words in the word dictionary are present in the data instance and taking a dot product between the word vector corresponding to the data instance and a word vector corresponding to the target text. Similarly, in an example embodiment, determining an n-gram similarity score for a data instance on a short list for a target text and the target text comprises generating an n-gram vector indicating which n-grams in the n-gram dictionary are present in the data instance and taking a dot product between the n-gram vector corresponding to the data instance and an n-gram vector corresponding to the target text. In various embodiments, other operations (e.g., other than the dot product between the term vector for the target text and the term vector for the data instance) may be used to numerically indicate the weighted (e.g., based on the corresponding term weights) overlap and/or union between the target text and the terms present in the data instance to determine the term similarity score.

Returning to FIG. 4, at step/operation 412, the screening device 10 may determine the data instances that are most similar to and/or most likely to correspond to the target text. For example, the screening device 10 may comprise means, such as processor 12, memory 14, screening circuitry 19, and/or the like, for determining which data instances are most similar to and/or most likely to correspond to the target text. For example, a data instance that has a term similarity score (word or n-gram similarity score) corresponding to a target text that is higher or greater than the corresponding term similarity scores of other data instances on the short list for the target text may be deemed more similar and/or more likely to correspond to the target text than the other data instances. For example, data instance A 508A may be determined to be more similar and/or more likely to correspond to the target text 502 than data instance B 508B because the data instance A n-gram similarity score 610A is larger and/or greater than the data instance B word similarity score 610B and/or n-gram similarity score. In an example embodiment, the k data instances that are most similar and/or most likely to correspond to the target text are identified from the data instances on the short list for the target text. In various embodiments, the integer k is one, two, five, ten, fifteen, and/or the like. In an example embodiment, a term similarity score threshold may be used to determine data instances that are most similar and/or most likely to correspond to the target text. For example, when the word similarity score corresponding to a data instance and a target text is greater than a word similarity score threshold, the data instance is determined to be similar to and/or likely to correspond to the target text. For example, when the n-gram similarity score corresponding to a data instance and a target text is greater than an n-gram similarity score threshold, the data instance is determined to be similar to and/or likely to correspond to the target text. For example, when both the word similarity score is less than the word similarity score threshold and the n-gram similarity score is less than the n-gram similarity score threshold, the data instance is determined to not be similar to and/or not likely to correspond to the target text.

At step/operation 414, the screening device 10 provides information/data regarding the data instances most similar to and/or most likely to correspond to the target text. For example, the screening device 10 may comprise means, such as processor 12, memory 14, communications circuitry 16, input/output circuitry 18, and/or the like, for providing the information/data regarding the data instances most similar to and/or most likely to correspond to the target text. For example, information/data identifying the data instances most similar to and/or most likely to correspond to the target text may be provided. In an example embodiment, one or more term similarity scores corresponding to the data instances most similar to and/or most likely to correspond to the target text may be provided. In various embodiments, the information/data regarding the data instances most similar to and/or most likely to correspond to the target text is provided to a machine user configured to automatically flag assets corresponding to the data instances identified by the information/data and/or perform other automatic functions corresponding to the data instances determined to be likely to correspond to the target text. In various embodiments, the machine user is executed by the screening device 10 and/or a user computing entity 20. In various embodiments, the information/data regarding the data instances most similar to and/or most likely to correspond to the target text is provided such that a user computing entity 20 receives the information/data and provides (e.g., displays) at least a portion of the information/data via an IUI provided via input/output circuitry 28.

In various embodiments, the plurality of data instances comprise data instances generated based on events, transactions, and/or the like that occurred during a period of time. For example, each night, the plurality of data instances generated that day may be analyzed to generate a short list for each target text of a target corpus and identify data instances from the plurality of data instances that are likely to correspond to a target text of a target corpus. In various embodiments, the period of time may be an hour, a day, a week, every two weeks, once a month, once a quarter, yearly, and/or the like. Thus, in various embodiments, a plurality of data instances may be batch processed to identify data instances that are likely to correspond to a target text of the target corpus.

FIG. 4 illustrates a flowchart describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Technical Advantages

As these examples illustrate, example embodiments contemplated herein provide technical solutions that solve real-world problems faced during the screening of data instances based on target texts of a target corpus. Traditional means for identifying data instances that are likely to correspond to target texts tend to have significant false positive and false negative rates. Moreover, the volume of data instances tends to be too large for manual screening of the data instances. For example, the data instances may be transactions and the target corpus may be a watch list and the volume of transactions may be quite large (e.g., hundred per minute or more during peak volume times). Thus, manual screening of all transactions is not feasible. Various embodiments provide technical solutions to the technical problem of being able to screen a large volume of data transactions in a computationally efficient manner that reduces the number of false positives and false negatives. In particular, by using multiple types of terms (e.g., words and n-grams) to identify data instances that are similar to target texts, false negatives and false positives are reduced. Moreover, the filtering of the data instances based on the largest term weight corresponding to the data instance removes data instances from consideration that have a low probability of corresponding to a target text in a computationally efficient manner. Thus, various embodiments provide improvements to the technical field of automated screening of data instances based on target texts of a target corpus.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for screening data instances based on a target text of a target corpus, the method comprising:
   identifying, by a processor of a screening device, a plurality of data instances for each target text of a target corpus;
   for each data instance of the plurality of data instances, determining, by the screening device, a word score and an n-gram score for the data instance based on at least two term dictionaries associated with the target corpus;
   filtering, by the screening device, the plurality of data instances based on the word score and the n-gram score corresponding to each data instance and at least one or more of a threshold word score or a threshold n-gram score, to generate a short list of data instances;
   determining, by the screening device, term similarity scores for each data instance of the short list based on a term overlap function between a term present in at least a portion of the data instance and the term present in the target text, the term being a respective word or n-gram; and
   providing, by the screening device, at least one data instance of the short list and an indication of its corresponding term similarity score.

2. The method of claim 1, wherein the target corpus is a watch list, the target text corresponds to an entity listed on the watch list, and each data instance is a transaction.

3. The method of claim 1, further comprising:
   identifying, by the screening device, a count of k data instances of the short list that have term similarity scores indicating they are the k data instances of the short list that are most similar to the target text; and
   providing, by the screening device, the k data instances and an indication of their corresponding term similarity scores.

4. The method of claim 1, wherein a term weight is determined by the product of (a) a number of times the term appears in the target text divided by a number of terms in the target text and (b) a number of target texts in the target corpus divided by a number of target texts in the target corpus comprising the term, the term being a word or an n-gram.

5. The method of claim 1, wherein an n-gram is a portion of a character string comprising n sequential characters of the character string.

6. The method of claim 5, where n is equal to three.

7. The method of claim 1, wherein a data instance is included in the short list when the data instance comprises at least one of (a) at least one word in common with the target text that has a word weight greater than a word weight threshold or (b) at least one n-gram in common with the target text that has an n-gram weight greater than an n-gram weight threshold.

8. The method of claim 1, further comprising:
   analyzing, by the screening device, the target corpus to generate a word dictionary and an n-gram dictionary for the target corpus, wherein the word dictionary and the n-gram dictionary comprise a respective dictionary of the at least two term dictionaries.

9. The method of claim 8, further comprising:
   determining, by the screening device and based on a frequency of a word in the target corpus, a word weight for the word; and
   determining, by the screening device and based on a frequency of an n-gram in the target corpus, an n-gram weight for the n-gram.

10. The method of claim 8, wherein determining the term similarity scores for the data instance and the target text comprises:
    determining, by the screening device, a word overlap function between words present in at least a portion of the data instance and words present in the target text;
    determining, by the screening device, an n-gram overlap function between n-grams present in at least a portion of the data instance and n-grams present in the target text; and
    providing, by the screening device, a result of the word overlap function as a word similarity score and a result of the n-gram overlap function as an n-gram similarity score.

11. The method of claim 10, wherein determining the term similarity scores for the data instance and the target text further comprises:
    generating, by the screening device, a word vector for the at least a portion of the data instance, wherein each element of the word vector corresponds to a word in the word dictionary and when a word in the word dictionary is present in the at least a portion of the data instance, an element of the word vector corresponding to the word has a non-zero value; and
    generating, by the screening device, an n-gram vector for the at least a portion of the data instance, wherein each element of the n-gram vector corresponds to an n-gram in the n-gram dictionary and when an n-gram in the n-gram dictionary is present in the at least a portion of the data instance, an element of the n-gram vector corresponding to the n-gram present in the at least a portion of the data instance has a non-zero value,
    wherein the word overlap function between words present in the at least a portion of the data instance and words present in the target text is a dot product between the word vector for the at least a portion of the data instance and a word vector corresponding to the target text, and
    wherein the n-gram overlap function between the n-grams present in the at least a portion of the data instance and the n-grams present in the target text is a dot product between the n-gram vector for the at least a portion of the data instance and a n-gram vector corresponding to the target text.

12. The method of claim 11, wherein the non-zero value of the word vector is equal to a word weight corresponding to the word for the target text and the non-zero value of the n-gram vector is equal to the n-gram weight corresponding to the n-gram for the target text.

13. The method of claim 1, further comprising:
- determining, by the screening device, an average term weight for the target text;
- determining, by the screening device, a standard deviation of term weight for the target text; and
- determining, by the screening device, one or more of the threshold word scores or the threshold n-gram scores based on the average term weight and the standard deviation of term weight.

14. An apparatus for screening data instances based on a target text of a target corpus, the apparatus comprising:
- processor circuitry configured to:
  - identify a plurality of data instances for each target text of a target corpus;
  - for each data instance of the plurality of data instances, determine a word score and an n-gram score for the data instance based on at least two term dictionaries associated with the target corpus;
  - filter the plurality of data instances based on the word score and the n-gram score corresponding to each data instance and at least one or more of a threshold word score or a threshold n-gram score, to generate a short list of data instances;
  - determine term similarity scores for each data instance of the short list based on a term overlap function between a term present in at least a portion of the data instance and the term present in the target text, the term being a respective word or n-gram; and
  - provide at least one data instance of the short list and an indication of its corresponding term similarity score.

15. The apparatus of claim 14, wherein the target corpus is a watch list, the target text corresponds to an entity listed on the watch list, and each data instance is a transaction.

16. The apparatus of claim 14, wherein the processing circuitry is further configured to:
- identify a count of k data instances of the short list that have term similarity scores indicating they are the k data instances of the short list that are most similar to the target text; and
- provide the k data instances and an indication of their corresponding term similarity scores.

17. The apparatus of claim 14, wherein a term weight is determined by the product of (a) a number of times the term appears in the target text divided by a number of terms in the target text and (b) a number of target texts in the target corpus divided by a number of target texts in the target corpus comprising the term, the term being a word or an n-gram.

18. The apparatus of claim 14, wherein an n-gram is a portion of a character string comprising n sequential characters of the character string.

19. The apparatus of claim 18, where n is equal to three.

20. A computer program product for screening data instances based on a target text of a target corpus, comprising at least one non-transitory storage medium, the at least one non-transitory storage medium storing computer executable instructions, the computer executable instructions comprising computer executable code configured to, when executed by processing circuitry of an apparatus, cause the apparatus to:
- identify a plurality of data instances for each target text of a target corpus;
- for each data instance of the plurality of data instances, determine a word score and an n-gram score for the data instance based on at least two term dictionaries associated with the target corpus;
- filter the plurality of data instances based on the word score and the n-gram score corresponding to each data instance and at least one or more of a threshold word score or a threshold n-gram score, to generate a short list of data instances;
- determine term similarity scores for each data instance of the short list based on a term overlap function between a term present in at least a portion of the data instance and the term present in the target text, the term being a respective word or n-gram; and
- provide at least one data instance of the short list and an indication of its corresponding term similarity score.

* * * * *